United States Patent Office 3,631,008
Patented Dec. 28, 1971

3,631,008
ODD/EVEN COPOLYMERS
Roger D. A. Lipman, Yonkers, N.Y., assignor to Geigy Chemical Corporation, Ardsley, N.Y.
No Drawing. Continuation-in-part of application Ser. No. 621,451, Mar. 8, 1967. This application Apr. 24, 1968, Ser. No. 723,913
Int. Cl. C08f 15/40
U.S. Cl. 260—80.78                        5 Claims

ABSTRACT OF THE DISCLOSURE

Sticky, semi-solid copolymers of three or more alpha olefins useful as pour point depressants or adhesives are disclosed, the copolymers being composed of monomer residues having both odd and even numbers of carbon atoms and having specified side chain lengths.

---

This is a continuation-in-part of my copending application Ser. No. 621,451, filed Mar. 8, 1967 and now abandoned.

This invention relates to new copolymers of alpha olefins and to compositions containing such copolymers.

Copolymers of alpha olefins are, of course, well known. The patent to Young, 2,534,095, for example, discloses copolymers of propylene or isobutylene with minor proportions (1–25%) of higher alpha olefins of say 6 to 20 carbon atoms, and having molecular weights of say 2 to 30,000. Such copolymers, made using Friedel-Crafts catalysts, are said to be semi-solid tacky materials useful as viscosity index improvers for lubricating oils. Hewett et al. in U.S. Pat. No. 2,895,915 discloses copolymers of alpha olefins having 10–22 carbon atoms made using Ziegler catalysts. They have molecular weights of say 100,000 to 1,000,000, and are said to be useful as pour point depressants in lubricating oils, a property not observed with the lower molecular weight materials of Young.

In accordance with the present invention, a new class of polymers is provided having properties different from those of either Young or Hewett et al. The invention is based upon the discovery that within a certain range of monomer size, the properties of copolymers containing monomer residues having both odd and even numbers of carbon atoms are substantially different from, and in several aspects advantageous over, the properties of copolymers having only monomer residues with an odd or an even number of carbon atoms.

The invention, in one aspect, thus comprises a copolymer of at least three alpha olefins having from 7 to 20 carbon atoms, at least one-third and not more than two-thirds, on a molar basis, of said copolymer comprising residues of monomers having an even number of carbon atoms, the balance being residues of monomers having an odd number of carbon atoms, said copolymer comprising a main chain, every other carbon atom of which suspends a side chain having an average of between about 6 and 14, preferably about 10 to about 13 carbon atoms.

The novel copolymers have, in general, intrinsic viscosities in cyclohexane at 25° C. between about 0.1 and about 10 dl./g.[1] They are non-crystalline materials which are quite different from copolymers made entirely from monomers having an odd or an even number of carbon atoms in the molecule. To illustrate, a copolymer made according to the invention from approximately equal amounts of $C_{11}$, $C_{12}$, $C_{13}$, and $C_{14}$ alpha olefins, is soft, tacky and very sticky at room temperature, while copolymers of like intrinsic viscosity made from $C_6$, $C_8$, $C_{10}$, $C_{12}$, $C_{14}$, $C_{16}$

[1] Intrinsic viscosities here and elsewhere are given in deciliters per gram.

mixtures or $C_{14}$, $C_{16}$, $C_{18}$ mixtures soften only at elevated temperatures and appear waxy at room temperature. The effect is also dependent on the *average* length of the side chains. Thus, for example, a copolymer of $C_{11}$, $C_{12}$, $C_{13}$, $C_{14}$, $C_{15}$, $C_{16}$, $C_{17}$, $C_{18}$ monomers according to the invention, having an average side chain of 11.2 is sticky and tacky, whereas a copolymer of similar molecular weight made from $C_{15}$, $C_{16}$, $C_{17}$, $C_{18}$ mixtures and having an average side chain of 14.2 is waxy even though made from odd-even monomers. That the side chain length is not itself controlling is indicated by the fact that another copolymer from a $C_{12}$, $C_{14}$, $C_{16}$ mixture having an average side chain of 11.2 is again waxy.

The monomers used in making the copolymers according to the invention are preferably though not necessarily adjacent homologs of one another, i.e. in a copolymer of monomers $M_1$, $M_2$, $M_3$, . . . $M_n$, $M_1$ differs from $M_2$ which differs from $M_3$, etc., by one —$CH_2$— unit.

The monomer mixture may contain minor amounts, i.e. less than say 5% of diolefin. While comparatively minor amounts may be tolerated, it is preferred not to have diolefins present since they tend to impart oxidation instability to the finished product, leading to sludge formation and the formation of lacquer precursors such as epoxides and ketones.

Various other, essentially inert, ingredients such as paraffins and internal olefins may also be present in the monomer mixtures.

The copolymers according to the invention are useful in various ways. They are excellent pour point depressants for oils, especially hydrocarbon lubricating oils. Their performance in that capacity is substantially superior to the performance of copolymers having monomer residues with only odd or only even numbers of carbon atoms. The copolymers are also of use in adhesive compositions in admixture with solvents and other conventional adhesive components.

The invention, in other aspects, thus comprises lubricating oil compositions containing the copolymers defined; and adhesive compositions comprising the copolymers and organic solvents.

The novel copolymers are made by bringing the monomers in question into contact with a suitable catalyst under appropriate reaction conditions. The catalysts may be any of those commonly referred to as "low pressure" catalysts. These include, for example, chromium oxide, or mixtures of chromium oxide and strontium oxide supported on a silica, alumina, silica-alumina, zirconia or thoria bed;[2] nickel; or cobalt supported on charcoal;[3] and molybdenum oxide supported on alumina.[4]

Of interest are the three component catalysts taught by D'Allelio.[5] Of particular interest are the so-called Ziegler or Ziegler-Natta catalysts.

As is well known, Ziegler catalysts are prepared from two components, the first of which is an organometallic compound or a metal hydride in which the metal is chosen from Groups I and III of the Periodic Chart of the Elements.[6] Examples of such compounds are triethylaluminum, tri-isobutyl aluminum, tri-n-propyl aluminum, diethyl aluminum chloride, diethyl aluminum hydride diethylberyllium, phenyl lithium, and lithium hydride. The preferred compounds are diethyl aluminum chloride and triethyl aluminum.

The second component of the Ziegler catalyst is a compound of a metal of Groups IV–B to VI–B and VIII of

[2] See U.S. Pat. 2,825,721.
[3] See U.S. Pats. 2,658,059, 2,692,261, 2,692,295, 2,717,888, and 2,717,889.
[4] See U.S. Pats. 2,692,257, 2,692,258, and 2,780,617.
[5] See U.S. Pat. 3,299,024.
[6] The version set out at pages 448–9 of the Handbook of Chemistry and Physics, 43rd edition, 1961–2, published by the Chemical Rubber Publishing Co. is referred to.

the Periodic Chart of the Elements, preferably a compound of a metal of Groups IV–B to VI–B. Halides or oxyhalides are advantageously employed. Examples of suitable compounds include vanadium tetrachloride, vanadium trichloride, vanadyl trichloride, titanium tetrachloride, titanium trichloride, titanium tetrafluoride and tungsten hexachloride. Titanium trichloride is generally preferred.

The molecular ratio of the organo-metallic compound (the first component) to the metal compound (the second component) in the Ziegler catalyst may vary widely, from say 0.1 to 10 or more. The ratio is not critical, but for economy, ratios of say 1 to 5 are preferred.

The proportion of catalyst to monomer is again not a critical factor. Indeed since the roll of the composition in question is that of a catalyst or initiator, any proportion can be used though, of course, excessively small proportions will give low conversions and to use excessive amounts is wasteful. Usually 0.0001 to 0.01 mol of catalyst per mol of olefin is used, based on the organo-metallic (first) component, in the case of a Ziegler catalyst.

The polymerization is normally carried out in the presence of a liquid diluent. The diluent may be any organic solvent inert to the monomers and catalyst components. Aliphatic paraffinic hydrocarbons, cycloparaffins or aromatic hydrocarbons may be used. The preferred diluent is cyclohexane.

In carrying out the polymerization using a Ziegler catalyst, the two components of the catalyst are added to the diluent. Usually the first component, e.g., $Al(Et)_2Cl$, is added to the diluent followed by the second component, e.g., $TiCl_3$, to form a slurry. The reverse order may be followed, however, if desired.

The monomers, diluent and catalyst slurry are all introduced, in the absence of air, into a reaction zone, which is normally in a pressure vessel equipped with suitable temperature control, i.e., heating or cooling equipment.

The precise reaction conditions maintained in the reaction zone will be governed by the character of the monomer feed and by the qualities desired in the product. Moreover, the temperature, pressure and contact time will be interrelated.

Broadly speaking, the reaction temperature will range from about 20° C. to about 200° C. Pressure will be from about 0 p.s.i.g. to about 3000 p.s.i.g. The reaction time should be such as to give a monomer conversion of between about 10% and about 100% normally between about 50% and about 100%.

The polymerization can be carried out continuously, using essentially the techniques described in the copending applications of Cobbs et al., Ser. Nos. 580,973, 580,974 and 581,503, filed Sept. 21, 1966, as continuations-in-part of applications Ser. Nos. 479,415, and 479,416, filed Aug. 13, 1965, or it can be carried out under batch conditions.

Used as pour point depressants, the novel copolymers are added to hydrocarbon lubricating oils in amounts required to give a substantial depressant effect. Normally, this will require a concentration of from say 0.05 to 5 percent. Such oils may, of course, contain other additions such as viscosity index improvers, anti-oxidants and the like. While the nature of the oil will have an effect on the magnitude of the depression, so far as has been determined there is no hydrocarbon lubricating oil in which the present copolymers do not have a substantial effect in relatively low concentrations.

As adhesives, the novel copolymers may be employed in admixture with components conventionally employed in adhesive compositions. In the simplest cases, adhesive compositions comprise (1) the copolymer in question with an organic solvent such as hexane, cyclohexane, toluene and like aliphatic, alicyclic and aromatic solvents; or (2) the copolymer in question with a tackifying resin such, for example, as the glycerol ester of hydrogenated resin. Coated on paper, wood, metal, etc., and allowed to dry, these compositions provide pressure sensitive adhesive surfaces which may be adhered to similar or dissimilar surfaces, coated or uncoated.

It will readily be appreciated that in such compositions, the proportion of solvent is not at all critical and may, for example, be regulated according to the physical consistency desired in the composition. Normally concentrations of 5 to 50% polymer are used.

The invention will be further described with reference to the following specific examples which are given for purposes of illustration only.

EXAMPLE I

In a series of runs, measured amounts of a mixture of $C_{11}$–$C_{14}$ alpha olefins (Monomer A) and a mixture of $C_{14}$–$C_{18}$ alpha olefins (Monomer B) having the compositions set forth below, were charged with 2 g.

$TiCl_3 \cdot \frac{1}{3} AlCl_3$ and 2.6 ml. $AlEt_2Cl$ in 21 cyclohexane to a 1 gal. autoclave.

Monomer A composition [7] (wt. percent)

| | |
|---|---|
| $C_{11}$ | 24.3 |
| $C_{12}$ | 24.2 |
| $C_{13}$ | 25.2 |
| $C_{14}$ | 26.3 |
| | 100.0 |

Monomer B composition [7] (wt. percent)

| | |
|---|---|
| $C_{14}$ | 41.5 |
| $C_{16}$ | 34.5 |
| $C_{18}$ | 24.0 |
| | 100.0 |

[7] Monomer A contained about 4% diolefin and about 4% inert material. Monomer B contained about 10% inert material. The distribution of the diolefins and inert material as to chain length was not determined.

The clave was maintained at a selected temperature which varied from run to run. After a reaction time of 19 hours, the catalyst was deactivated with methanol and the polymer present in solution in cyclohexane was recovered by distilling off the solvent. The polymers were tacky semi-solids, extremely sticky to the touch. Small amounts (0.3 and 0.5% by weight) of the various polymers were dissolved in TL5499, a lubricating oil having a pour point of +3° F. The pour points of the oil/additive mixtures were measured and are reported in Table 1.

TABLE 1

| Run | T., °C. | Monomer (g.) A | Monomer (g.) B | Yield, percent | Side chain length (average) | Pour point, °F. 0.3 wt. percent | Pour point, °F. 0.5 wt. percent |
|---|---|---|---|---|---|---|---|
| 1 | 55.0 | 114.0 | 10.9 | 23.0 | 10.6 | −36 | −39 |
| 2 | 25 | 91.0 | 28.2 | 31.0 | 11.0 | −35 | −38 |
| 3 | 52 | 69.6 | 43.4 | 76.5 | 11.4 | −26 | −32 |
| 4 | 78 | 69.6 | 43.4 | 82.2 | 11.4 | −31 | −34 |
| 5 | 88 | 60.0 | 60.0 | 87.0 | 11.75 | −30 | −34 |

EXAMPLE 2

In a series of runs, measured amounts of a mixture of $C_{11}$–$C_{14}$ alpha-olefins (Monomer)[8] A and a mixture of $C_{15}$–$C_{18}$ alpha-olefins (Monomer C) having the composition set forth below were charged with 2 g.

$$(TiCl_3 \cdot \tfrac{1}{3} AlCl_3)$$

and 2.6 ml. $Et_2AlCl$ in 2 l. cyclohexane to a 1 gal. autoclave.

Monomer C composition wt. percent [9]

| | |
|---|---|
| $C_{15}$ | 27.6 |
| $C_{16}$ | 29.6 |
| $C_{17}$ | 28.6 |
| $C_{18}$ | 14.2 |
| | 100.0 |

[9] Includes about 2% diolefin and about 11% inert materials.

The clave was maintained at a selected temperature which varied from run to run. After a reaction time of 19 hours, the catalyst was deactivated with methanol and the polymer present in solution in cyclohexane was recovered by distilling off the solvents. The polymers were tacky, semi-solids, extremely sticky to the touch. Small amounts (0.3 and 0.5% by weight) of the various polymers were dissolved in TL5499, a lubricating oil having a pour point of +3° F. The pour points of the oil/additive mixtures were measured and are reported in Table 2.

[8] The same monomer mixture used in Example 1.

TABLE 2

| Run | T., ° C. | Monomer (g.) A | Monomer (g.) B | Yield, percent | Side chain length (average) | Pour point, ° F. 0.3 wt. percent | Pour point, ° F. 0.5 wt. percent |
|---|---|---|---|---|---|---|---|
| 1 | 25 | 110.4 | 0 | 42.1 | 10.38 | −33 | −37 |
| 2 | 25 | 112.2 | 6.8 | 34.5 | 10.55 | −37 | −43 |
| 3 | 53 | 99.7 | 16.0 | 18.0 | 10.8 | −39 | −41 |
| 4 | 55 | 86.7 | 33.3 | 62.0 | 11.25 | −41 | −37 |
| 5 | 25 | 0 | 113.0 | 17.8 | 14.22 | +3 | +3 |

N. B. Runs 1, 2 and 5 were conducted with twice the quantity of catalyst stated above.

EXAMPLE 3

The polymer from run 9 in Example 1 was made up into a 20% w./v. solution in cyclohexane (20 g. polymer/100 ml. cyclohexane). The solution was applied to two sheets of bond paper using a No. 40 Film Applicator Bar to give a deposit of roughly 10 mg. resin/in.$^2$. The coatings were allowed to dry and then were stuck together under a pressure of approximately 0.25 p.s.i. They were then peeled apart, the force required to effect peeling being measured. It was found that the force required was 1.36 lbs. Two commercially available adhesives required 0.93 lb. and 1.48 lbs. respectively.

EXAMPLE 4

Following the teachings of D'Allelio (U.S. Pat. 3,299,024), 4 mls. of a solution of butyl lithium in hexane (16% w./v.) was added to a stirred solution of 6.24 g. styrene in 60 g. dried benzene under a nitrogen atmosphere. After 4 hours, 0.92 mls. of $Et_3Al_2Cl_3$ was added to the reaction mixture and the orange-red color of the polystyryllithium was discharged. Next, 1.22 g. of $T \cdot Cl_3$ (AA grade) was added and the slurry was diluted with a further 160 g. of dry benzene.

After aging the catalyst for 30 minutes, 43.3 g. of Monomer A (Example 1 above), and 16.6 g. of Monomer C (Example 2 above), corresponding to an average pendant group length of 11.25 for the total olefin mixture were added to the reaction vessel. The temperature of the mixture was then brought to 55° C. and maintained for 50 hours. Isolation of the polymer produced 61 g. of material, corresponding to a 91% yield on the alpha olefins.

The polymer exhibited the following pour point depressancy in Texaco TL5499 oil:

| Weight percent of polymer in oil | 0 | 0.05 | 0.1 | 0.2 |
|---|---|---|---|---|
| Pour point, ° F. | +5 | −20 | −20 | −30 |

EXAMPLE 5

Three polymers were prepared using essentially the reaction conditions of Example 1. Polymer D was made from the following olefin mixture (Table 3):

TABLE 3

| Number of carbon atoms | Percent Paraffin | Alpha olefin | Diolefin | Internal olefin | Other |
|---|---|---|---|---|---|
| 10 | | | | | 0.3 |
| 10 | 0.1 | 0.4 | 0–0.1 | 0–0.1 | 0–0.1 |
| 11 | 0.3 | 24.0 | 1.1 | 0.6 | 0.6 |
| 12 | 0.2 | 21.7 | 1.2 | 0.6 | 0.4 |
| 13 | 0.2 | 21.4 | 1.3 | 0.4 | 0.2 |
| 14 | 0.1 | 22.3 | 1.1 | 0.4 | 0–0.1 |
| 15 | | 0.9 | 0.1 | 0.1 | |
| Total | 0.9 | 90.7 | 4.8 | 2.1 | 1.5 |

Polymer E was prepared from a mixture of olefins in the proportion listed above for Monomer A, but containing 1% diolefins of $C_{11}$–$C_{14}$ chain length. Polymer F was made from a mixture of olefins prepared to correspond to Monomer A but containing only 0.1% diolefins of $C_{11}$–$C_{14}$ chain length. The three polymers were screened in oil having a pour point of +5° F., with the following results:

| | Pour point, ° F. at weight percent in oil | | | |
|---|---|---|---|---|
| | 0.1 | 0.3 | 0.5 | 1.0 |
| Polymer: | | | | |
| D | −5 | −25 | −25 | −20 |
| E | −15 | −30 | −30 | −25 |
| F | −25 | −25 | −30 | −30 |

What is claimed is:

1. A copolymer of at least three alpha-olefins each having from 7 to 20 carbon atoms in the molecule, at least about 33 mol percent and not more than 67 mol percent of said copolymer comprising residues of monomers having an even number of carbon atoms, the balance being residues of monomers having an odd number of carbon atoms, said copolymer comprising a main chain from which side chains having an average of between about 6 and about 14 carbon atoms are subtended, and having an intrinsic viscosity in cyclohexane at 25° C. of between about 0.1 and about 10 dl./g.

2. The copolymer claimed in claim 1 wherein the comonomers are adjacent members of an homologous series.

3. The copolymer claimed in claim 1 wherein the comonomers contain between about 9 and about 18 carbon atoms.

4. The copolymer claimed in claim 1 wherein the side chains comprise between about 10 and about 13 carbon atoms.

5. An adhesive composition comprising an organic solvent and a copolymer of at least three alpha-olefins each having from 7 to 20 carbon atoms in the molecule, at least about 33 mol percent and not more than 67 mol percent of said copolymer comprising residues of monomers having an even number of carbon atoms, the balance being residues of monomers having an odd number of carbon atoms, said copolymer comprising a main chain from which side chains having an average of between about 6 and about 14 carbon atoms are subtended, and having an intrinsic viscosity in cyclohexane at 25° C. of between about 0.1 and about 10 dl/g.

References Cited

UNITED STATES PATENTS

| | | | |
|---|---|---|---|
| 3,346,498 | 10/1967 | De Vries | 252—59 |
| 3,330,780 | 7/1967 | Stanton | 252—51.5 |
| 3,305,507 | 2/1967 | White | 260—29.6 |

JOSEPH L. SCHOFER, Primary Examiner

R. S. BENJAMIN, Assistant Examiner

U.S. Cl. X.R.

156—334; 252—59

PO-1050
(5/69)

UNITED STATES PATENT OFFICE
CERTIFICATE OF CORRECTION

Patent No. 3,631,008      Dated December 28, 1971

Inventor(s) Roger D. A. Lipman

It is certified that error appears in the above-identified patent and that said Letters Patent are hereby corrected as shown below:

Col. 5, line 2, "(Monomer)$^8$ A" should read -- (Monomer A)$^8$ --;

Table 2, under "Monomer(g)", "B" should read -- C --.

Signed and sealed this 25th day of July 1972.

(SEAL)
Attest:

EDWARD M. FLETCHER, JR.    ROBERT GOTTSCHALK
Attesting Officer           Commissioner of Patents